United States Patent [19]
Richardson

[11] 3,800,990
[45] Apr. 2, 1974

[54] COLLAPSIBLE CONTAINER FOR AUTO TRUNK

[76] Inventor: William B. Richardson, 3502 Bryant Ave., Palo Alto, Calif. 16503

[22] Filed: Jan. 17, 1972

[21] Appl. No.: 218,203

[52] U.S. Cl. .................... 224/42.42 R, 217/12 R
[51] Int. Cl. ............................................. B60r 5/04
[58] Field of Search.... 224/42.03 A, 42.03 R, 29 R, 224/42.42 R; 217/12 R, 13, 65

[56] References Cited
UNITED STATES PATENTS

| | | | |
|---|---|---|---|
| 1,755,543 | 4/1930 | Hill | 224/42.42 R |
| 3,132,781 | 5/1964 | Poczatek | 224/42.42 R X |
| 2,729,386 | 1/1956 | Haddad | 217/65 X |
| 3,006,496 | 10/1961 | Weiman | 217/12 R |

Primary Examiner—Gerald M. Forlenza
Assistant Examiner—Jerold M. Forsberg
Attorney, Agent, or Firm—Julian Caplan

[57] ABSTRACT

A container which fits into an auto trunk to transport garden trash and other materials consists of interfitting parts which can be disassembled after use for compact storage. Two vertical, irregularly shaped sides are supported by six transverse members. Two of the transverse members are hinged together, one fitting on the bottom of the trunk, the other slanting upwardly-rearwardly to the level of the bottom edge of the trunk opening, the hinged connection permitting conforming to the varying dimensions of trunks of different makes and models of cars. A horizontal rear bottom is located rearward of the two hinged members and the three last-named transverse members are provided with spaced guides which receive the edges of the sides. A vertical back is positioned rearward of the rear bottom; a vertical front forward of the forward hinged member. A slanted back slopes upward-rearward from the top edge of the vertical back. The various members hook together and are braced to keep the parts in proper position.

3 Claims, 3 Drawing Figures

PATENTED APR 2 1974 3,800,990

COLLAPSIBLE CONTAINER FOR AUTO TRUNK

This invention relates to a new and improved collapsible container for installation in an automobile trunk.

More particularly, the invention relates to a container made of sides and transverse panels which, when assembled, define a container which fits conveniently into an automobile trunk and may be used to transport materials such as garden trash. A particular feature of the invention is the fact that it will fit into a wide variety of trunks of different makes and models of automobiles without major structural change. It will be understood that the floors of most trunk compartments are lower than the ledge at the bottom of the lid opening by varying distances, and further that the height from the floor to the lid (when opened) likewise varies with different makes and models. Further, the longitudinal depth of trunks is subject to variation. The present invention is adaptable to a considerable variety of different trunk compartment dimensions.

Another feature of the invention is the fact that it is conveniently assembled for use and disassembled after use; and when disassembled, occupies a relatively small space. No special tools are required for the assembly and disassembly and the operations are sufficiently simple so that no considerable mechanical aptitude is required.

One of the features of the invention is the fact that the bottom of the container comprises three separate panels and that two of these panels are hinged together about a transverse horizontal axis so that they will accommodate different elevations between trunk bottoms and lid opening ledges without causing a gap through which small trash particles might fall. Hence the container is comparatively tight yet is adjustable to fit the conditions of the automobile in which it is installed.

Still another feature of the invention is the fact that braces and guideways are provided for the interfitting parts which facilitate rapid assembly and disassembly and yet provide a relative strong structure when assembled. The edges of the sides are fitted into guideways in certain of the parts and by hooking a few hooks into cooperating eyes the entire container may be assembled and retained in place. The use of screws, bolts, ties, and the like, is eliminated.

Another feature of the invention is its relatively low cost of construction and the fact that it requires little or no repair or maintenance cost despite repeated use.

Another feature of the invention is the fact that when installed in a trunk it need not be braced or tied to prevent the container and its contents from spilling out of the trunk compartment.

Other objects of the present invention will become apparent upon reading the following specification and referring to the accompanying drawings in which similar characters of reference represent corresponding parts in each of the several views.

Figure 3:
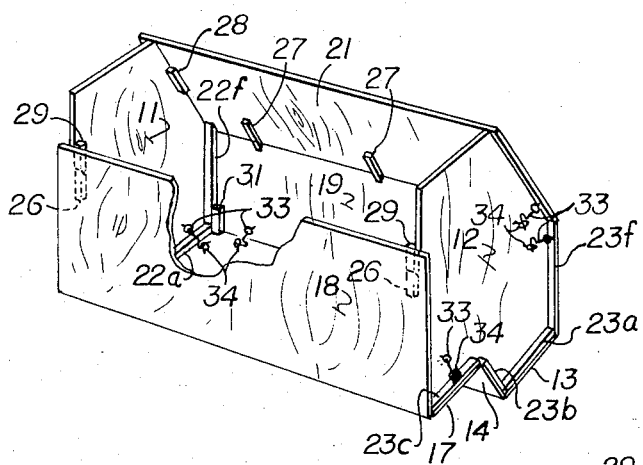
FIG. 3 is a perspective view of the container assembled, the view being partially broken away to reveal internal construction.

In accordance with the present invention the container consists of a left and a right side panel 11, 12 and six rectangular transverse panels, all hereinafter described in detail. The sides and panels may be cut from plywood or other material. The sides 11 and 12 are substantially the same in outline and are irregularly shaped. Their rear edges are vertical and there are horizontal rearward extending top and bottom edges, the bottom edges being somewhat shorter than the top edges. Commencing at the rear of the bottom edge, the outline of each side extends downwardly rearwardly in a bottom stretch and then horizontally in a bottom stretch. Thereafter, the edge extends vertically upwardly and then slants upwardly forwardly to intersect the rear of the top edge.

Front-bottom panel 13 rests upon the trunk compartment bottom 36 as far forwardly as clearance is provided. This panel is normally horizontal in installed position. It is connected to the upwardly rearwardly slanted panel 14 by a pair of strap hinges 16. The use of hinges 16 permits the panels 13 and 14 to assume varying positions relative to each other and preferably the meeting edges of both panels are beveled to permit a closer and tighter connection between the panels 13 and 14. To the rear of slanted bottom panels 14 is a rear bottom panel 17 which is generally horizontal and rests upon the bottom ledge 37 of the trunk lid opening. The back of the compartment is closed off by a vertical rear panel 18 which may be slightly shorter than the rear edges of the sides 12 to permit easy loading of the container. The front panel 19 is substantially vertical and extends from the forward edge of front-bottom panel 13 to a height which will fit into the opening of most trunk compartments. Above front panel 19 is a slanted front panel 21 which extends upwardly rearwardly to about the top edges of the sides 12. The angle of slanted front panel 21 is such so that it will ordinarily enable the container to fit within the trunk compartment when the lid 38 is opened to its maximum elevation.

Figure 2:
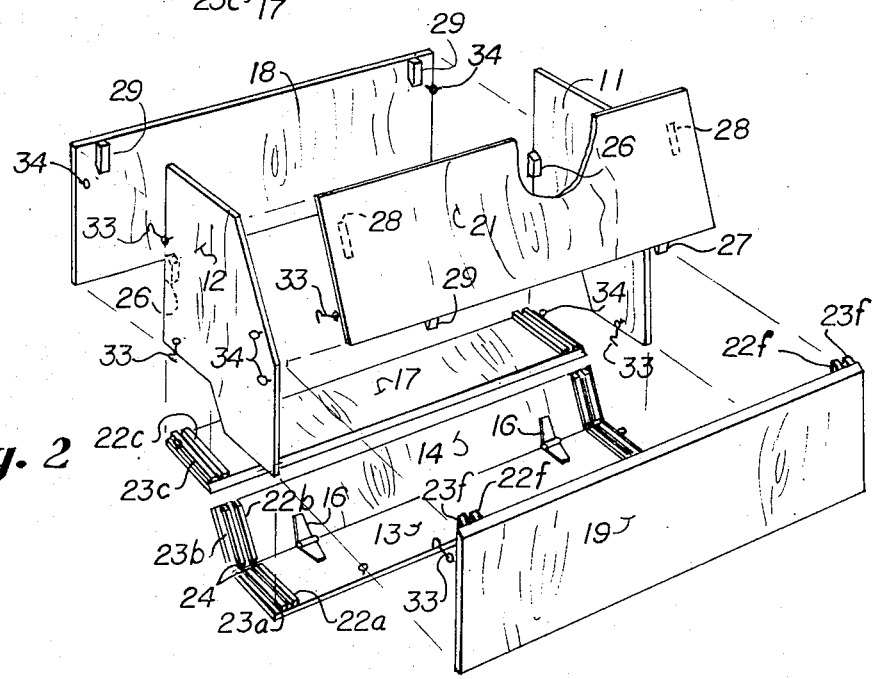
FIG. 2 is an exploded perspective view of the container partially broken away to reveal portions of other parts.

To facilitate assembly of the container, a number of guides and block braces are employed. Directing attention to panel 13, it will be seen that there are inner and outer guides 22a, 23a which are spaced apart about the thickness of the sides 11 or 12 and receive sides 11, 12 nailed or otherwise attached to the top surface of panel 13. These sides may be square cross-section strips of wood. The outmost guide 23a is located as close as possible to the outside edge of panel 13. The widths of the various panels are thus slightly greater than the spacing between sides 11 and 12. Similarly, panel 14 is provided with guides 22b, 23b which are in alignment with the corresponding guides 22a, 23a on panel 13. To permit hinge movement of panels 13 and 14 relative to each other, the corners 24 of the guides 22b, 23b are beveled. It will further be seen that the edge of panel 14 which abuts panel 13 is similarly beveled. Guides 22c, 23c are formed on panel 17, likewise in alignment with guides 22a, 23b. As shown partially in FIGS. 2 and 3, there are similar inner and outer guides 22f, 23f on the rearward face of front panel 19 and the upper edges of the guides 22f, 23f are formed with upwardly rearwardly slanted bevels which form a support for the panel 21. Further, the lower ends of guides 22f, 23f are spaced upward from the bottom edge of panel 19 to provide clearance for guides 22a, 23a. The front and the three bottom edges of each side 11, 12 fit between the respective guides 22, 23 on the panels 19, 13, 14, 17, and these guides retain the sides 11, 12 against outward or inward displacement.

Blocks 26 are located adjacent the back of the rear edges of sides 11, 12 about midway of the height thereof and blocks 29 are installed on sides 11 and 12 to rest upon the blocks 26 in assembled position. This arrangement prevents the panel 18 from being displaced vertically relative to sides 11, 12. Preferably, the bottom edges of blocks 26, 29 are slanted so that they interlock in assembled position.

Blocks 27 are installed on the inside of panel 21 adjacent the bottom edges thereof and project downwardly below said bottom edges to fit against the back of panel 19. Additionally, blocks 28 are fixed to the rear face of panel 21 and engage immediately inside the inner faces of the slanted forward edges of sides 11 and 12, thereby preventing lateral displacement of panel 21 relative to the sides 11, 12.

At least one block 31 is formed on the rear face of panel 19 to engage the inside edge of guide 22f and thereby to prevent lateral displacement.

To hold the parts in assembled position, hooks 33 and eyes 34 are installed as shown in the drawings. Thus, in the interior of the container, panel 19 is provided with two hooks 33 which mate with eyes 34 on the bottom panel 13. Similarly, each side 11, 12 is provided with a hook 33 which mates with an eye 34 on panel 13. These hold the sides 11 and 12 and panel 19 from outward movement relative to panels 13.

Panels 11 and 12 are each provided with hooks 33 which mate with eyes 34 on rear panel 18 and hold that panel against outward movement. Similarly, there are hooks 33 on each of the panels 19 (actually on guide 23f thereof) and panel 21 which mate with hooks 34 on the outside of panels 11 and 12 and there is also a hook 33 on each guide 23c of panel 17 which mates with an eye 34 on sides 11 and 12. Thus by interfitting the sides 11 and 12 in the guideways 22, 23 and interfitting the blocks 26–31 as has been described and hooking the various hooks 33 in the eyes 34 the device may be assembled.

Figure 1:
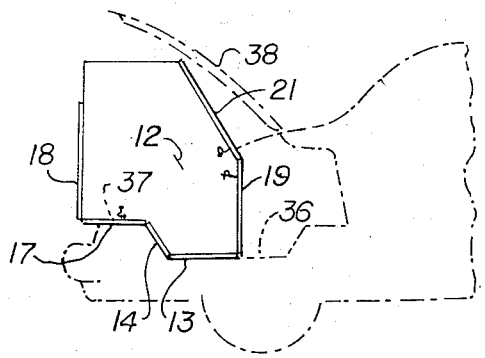
FIG. 1 is a schematic side elevational view showing the container installed in a vehicle trunk.

When installed as shown in FIG. 1, the panel 13 rests on the bottom 36 of the trunk compartment and the bottom panel 17 rests on the ledge 37. The whole container is fitted in the opening of lid 38 when in open position. To load, panel 18 may be removed. Upon completion of the job, the parts are readily disassembled, and conveniently transported and stored.

What is claimed is:

1. A collapsible container for installation in an auto trunk compartment having a rear opening comprising a pair of spaced, vertical, irregularly shaped sides, a front bottom panel positioned to rest substantially horizontally on the bottom of said compartment, a rear bottom panel positioned to rest substantially horizontally on the bottom of said rear opening of the trunk compartment, a slanted bottom panel slanted upwardly rearwardly between the rear and front edges of said front and rear bottom panels, respectively, hinge means hingedly connecting the rear edge of said front bottom panel to the front edge of said slanted bottom panel about a horizontal transverse axis, a substantially vertical front panel extending upward from the front edge of the front bottom panel, a rear panel at the rear edge of said rear bottom panel, all of said panels being flat and substantially rectangular and disposed transverse to said sides, pairs of guides spaced apart the thickness of said sides located adjacent each side end of each of a plurality of said panels to restrain edges of said sides against lateral displacement, interfitting hooks on some of said panels and eyes on adjacent panels to secure said panels in assembled position, first blocks on some of said panels positioned to engage adjacent panels to secure said panels in assembled position, second blocks on some of said panels to engage said sides and secure said last-mentioned panels and said sides in assembled position, said blocks detachably securing each said panel to the panel or side adjacent thereto, said rear bottom panel extending horizontally rearwardly of said rear opening and said slanted bottom panel closing off the bottom of said container against escape of the contents of said container, said container shaped and dimensioned to fit substantially entirely within said trunk compartment.

2. A container according to claim 1 which further comprises a slanted front panel slanting upwardly rearwardly from the upper edge of said front panel.

3. A container according to claim 1 in which said sides are displaced slightly inward of the outer edges of said panel.

* * * * *